United States Patent
Tidcomb

(10) Patent No.: US 6,224,078 B1
(45) Date of Patent: May 1, 2001

(54) STEERING ARRANGEMENT FOR AN OCCUPANT-PROPELLED VEHICLE

(76) Inventor: Steven Tidcomb, Four Laurel St., Beverly, MA (US) 01915-1236

( * ) Notice: Subject to any disclaimer, the term of this patent is extended or adjusted under 35 U.S.C. 154(b) by 0 days.

(21) Appl. No.: 09/122,302

(22) Filed: Jul. 24, 1998

Related U.S. Application Data

(60) Provisional application No. 60/053,676, filed on Jul. 24, 1997.

(51) Int. Cl.[7] ..................................................... B62M 1/16
(52) U.S. Cl. ..................... 280/250.1; 280/240; 280/244
(58) Field of Search ........................... 280/250.1, 242.1, 280/243, 244, 245, 246, 247, 248, 240, 263, 267, 304.1

(56) References Cited

U.S. PATENT DOCUMENTS

| | | |
|---|---|---|
| 3,666,292 | 5/1972 | Bartos . |
| 3,986,725 | 10/1976 | Terry . |
| 4,305,600 | 12/1981 | Mendez . |
| 4,417,742 | 11/1983 | Intengan . |
| 4,437,677 | 3/1984 | Ksayian . |
| 4,449,420 * | 5/1984 | Baba .................................. 74/501 R |
| 4,705,284 * | 11/1987 | Stout .................................... 280/282 |
| 4,811,964 | 3/1989 | Horn . |
| 4,840,076 | 6/1989 | Brubaker et al. . |
| 4,865,344 * | 9/1989 | Romero, Sr. et al. ................ 280/242 |
| 5,020,815 | 6/1991 | Harris et al. . |
| 5,280,936 | 1/1994 | Schmidlin . |
| 5,555,775 * | 9/1996 | D'Aluisio et al. .................... 74/551.5 |
| 5,775,708 * | 7/1998 | Heath ..................................... 280/234 |

FOREIGN PATENT DOCUMENTS

| | | | |
|---|---|---|---|
| 115951 * | 10/1942 | (AU) | ..................................... 280/267 |
| 527214 * | 10/1921 | (FR) | ..................................... 280/240 |

* cited by examiner

*Primary Examiner*—Anne Marie Boehler
*Assistant Examiner*—Avraham H. Lerner
(74) *Attorney, Agent, or Firm*—O'Connell Law Firm

(57) ABSTRACT

An occupant-propelled vehicle comprising a vehicle frame, a vehicle propulsion system with a movable force receiver, and a vehicle steering arrangement in one embodiment comprising a tilt-grip steering post, a steering drum, a steered wheel, a steered drum, and a flexible, sheathed cable. An inner member of the cable overlies the steered drum and the steering drum whereby a pivoting of the tilt-grip steering post induces a steering of the steered wheel. The steering post may have an axis of rotation perpendicular to its longitudinal axis and tangent to an arc of rotation of the moveable force receiver. The diameters of the steered and steering drums may be varied, and the steered drum may be disengagably indexed to the steered wheel. The steered wheel may be coupled to a second wheel to steer the second wheel in response to a steering of the steered wheel. In a second embodiment, the steering arrangement may comprise a flexible, sheathed cable with an inner member for transmitting loads in tension and compression that is reciprocatably retained within an outer sheath. A first end of the inner member may be coupled at a pivot point to the steering post and a second end of the inner member may be coupled at a pivot point to the steered wheel such that a pivoting of the steering post yields a steering of the steered wheel. The pivot points of the steering post and the steered wheel may be varied to mechanical advantage.

15 Claims, 10 Drawing Sheets

STEERING ARRANGEMENT FOR AN OCCUPANT-PROPELLED VEHICLE

This Appln claims benefit of Provisional No. 60/053,676 filed Jul. 24, 1997.

FIELD OF THE INVENTION

The present invention generally relates to occupant-propelled vehicles. More particularly, the present invention is directed to vehicle steering arrangements for occupant propelled vehicles.

BACKGROUND OF THE INVENTION

One knowledgeable in the art of occupant-propelled vehicles will be readily aware that there is a deficiency in the prior art relative to the steering of occupant-propelled vehicles such as wheel chairs. The problem is particularly prevalent with chairs propelled by a single-arm force receiver, such as a drive lever. Steering with such prior art devices has proven mechanically and functionally complex, commonly presenting users with an ergonomically unfriendly steering apparatus.

For example, in some devices, a user is required to rotate a control grip about an axis that is generally perpendicular to the user's arm to rotate a caster wheel via a chain, joint, or lever connection. In some steering mechanisms of this type, the grip communicates along its axis of rotation. In others, the grip is perpendicular to its axis of rotation. In both arrangements, many find the required contortion of one's wrist and arm while expending a driving force upon a force-receiving lever difficult and uncomfortable. Furthermore, the steering direction inadvertently may be affected by one's exertion of a propelling force.

Similarly inefficient and uncomfortable are prior art steering devices that require a user to rotate a shovel type handle. Other steering systems include complex multi-gear force transmission arrangements, and prior art systems commonly do not provide a means for disengaging the steering controls to allow free motion of the caster as would be useful when the chair is to be pushed by a second person.

In total, one sees that prior art occupant-propelled vehicle steering arrangements are undesirably complex and uncomfortable to operate. Consequently, it would be advantageous if one were to provide a steering arrangement that is simple, effective, and durable while being comfortable to operate.

SUMMARY OF THE INVENTION

Advantageously, a principal object of the present invention is to provide a steering arrangement for occupant-propelled vehicles that presents a solution to the deficiencies left by prior art steering arrangements for occupant-propelled vehicles.

Stated more particularly, the invention has primary objects of providing a vehicle steering arrangement that is simple in both manufacture and use.

It is a further object of the invention to provide a vehicle steering arrangement that accommodates the ergonomic needs of users of occupant propelled vehicles.

Still further objects of the present invention are to craft a vehicle steering arrangement for wheel chairs that enables effective steering control of a steered wheel or wheels by an occupant, including providing any necessary or desired mechanical advantage, while allowing the vehicle steering arrangement to be disengaged from the steered wheel quickly and easily to allow free rotation of the steered wheel.

These and many other objects and advantages of the present invention will become obvious both to one who reads the present disclosure and reviews the accompanying figures and to one who has the opportunity to take advantage of an embodiment of the present invention.

In accomplishing the aforementioned objects, one embodiment of the present invention contemplates an occupant-propelled vehicle comprising a vehicle frame, a vehicle propulsion system operably associated with the vehicle frame with a movable force receiver for receiving an input force from an occupant, and a vehicle steering arrangement. Essentially, one preferred vehicle steering arrangement overcomes the previously-described disadvantages found in the prior art by providing a tilt-grip steering post pivotally attached to the force receiver, a steering drum coupled to the tilt-grip steering post, a steered drum coupled to a steered wheel that is steerable about a steering axis, a flexible, sleeved cable overlying and engaged with the steering drum and the steered drum whereby a pivoting of the tilt-grip steering post causes a rotation of the steering drum that yields a reciprocation of an inner member of the sleeved cable that causes a rotation of the steered drum to induce a steering rotation of the steered wheel about the steering axis.

Preferably, the tilt-grip steering post will have an axis of rotation perpendicular to a longitudinal axis of the tilt-grip steering post. Still more preferably, the tilt-grip steering post will have an axis of rotation tangent to an arc of rotation of the moveable force receiver. This particular aspect of the steering arrangement allows the invention to overcome many of the disadvantages found in the prior art, particularly the ergonomic disadvantages summarized above. By providing a tilt-grip steering post with an axis of rotation tangent to the arc of rotation of the moveable force receiver, an occupant is able to operate the steering system comfortably and effectively even while exerting significant force to move the moveable force receiver to propel the vehicle.

In any event, the vehicle frame may be a wheel chair frame with more than two wheels wherein the steered wheel is a caster with a yoke rotatable about a yoke stem, which acts as the steered wheel's steering axis. With a vehicle having four or more wheels, it may be preferably to have one of the wheels vertically biased toward a surface on which the vehicle travels to ensure contact of the steered wheel with the ground even on uneven terrain. In particular applications, a manipulation of the relative sizes of the drums may be desired. For example, one might desire that a given tilt of the tilt-grip steering post would result in an amplified rotation of the steered wheel. This could be accomplished by causing the steering drum to be relatively larger than the steered drum by a selected ratio.

Since there may be times when free rotation of the steered wheel may be desired, the steered drum may be disengagably indexed with the steered wheel by an means for indexing the steered drum to the steered wheel such as by a set screw, a pin that is slidably engagable with the steered drum and the yoke of the steered wheel, or a gross tension adjustment where friction is used to index the cable to the steered drum. For most effective steering, it may be desirable to couple the steered wheel to a second wheel of the vehicle for steering the second wheel in response to a steering of the steered wheel. This may be done by a number of means such as by a flexible shaft, a tie rod, or a toothed belt.

Providing a means for maintaining and/or adjusting the neutral position of the steering assembly also may improve the assembly's overall function. For example, an end of the outer sheath may be threadedly connected to the vehicle frame such as at the force receiver for adjustment relative thereto to change the effective length of the cable sheath. Alternatively, the effective length of the cable sheath may be adjusted by a threaded connection of a first section of a body portion of the sheath with a second section of the body portion of the sheath.

An alternative vehicle steering arrangement similarly comprises a steered wheel and a tilt-grip steering post, and a flexible, sheathed cable. However, in this alternative embodiment, the sheathed cable has an inner member that is capable of transmitting loads in tension and compression within an outer sheath. As such, this steering arrangement may be considered a push/pull arrangement since the sheathed cable pushes the steered drum to steer in one direction and pulls the steered drum to steer in a second direction. In any event, a first end of the cable is coupled at a pivot point to the steering post, and a second end of the cable is coupled at a pivot point to the steered wheel such that a pivoting of the steering posts yields a reciprocation of the inner member and a consequent steering of the steered wheel about its steering axis.

In a manner similar to the first steering embodiment, a manipulation of a distance of the respective pivot point from an axis of rotation of the steering post and/or the steering axis of the steered wheel can enable a selected ratio of rotation. Again, with this embodiment of the invention, a means for adjusting the neutral position of the end of the cable may be desirable. In this embodiment, the adjusting means again may comprise a threaded connection of the outer sheath with the vehicle frame such as along the force receiver. Another adjusting means may comprise a threaded connection of a first section of the body portion of the sheath with a second section of the body portion of the sheath with a compression spring providing lateral support for the inner member.

One will appreciate that the foregoing discussion broadly outlines the more important features of the invention to enable a better understanding of the detailed description that follows and to instill a better appreciation of the inventor's contribution to the art. Before any embodiment of the invention is explained in detail, it must be made clear that the following details of construction, descriptions of geometry, and illustrations of inventive concepts are mere examples of possible manifestations of the invention.

DETAILED DESCRIPTION

Figure 1:
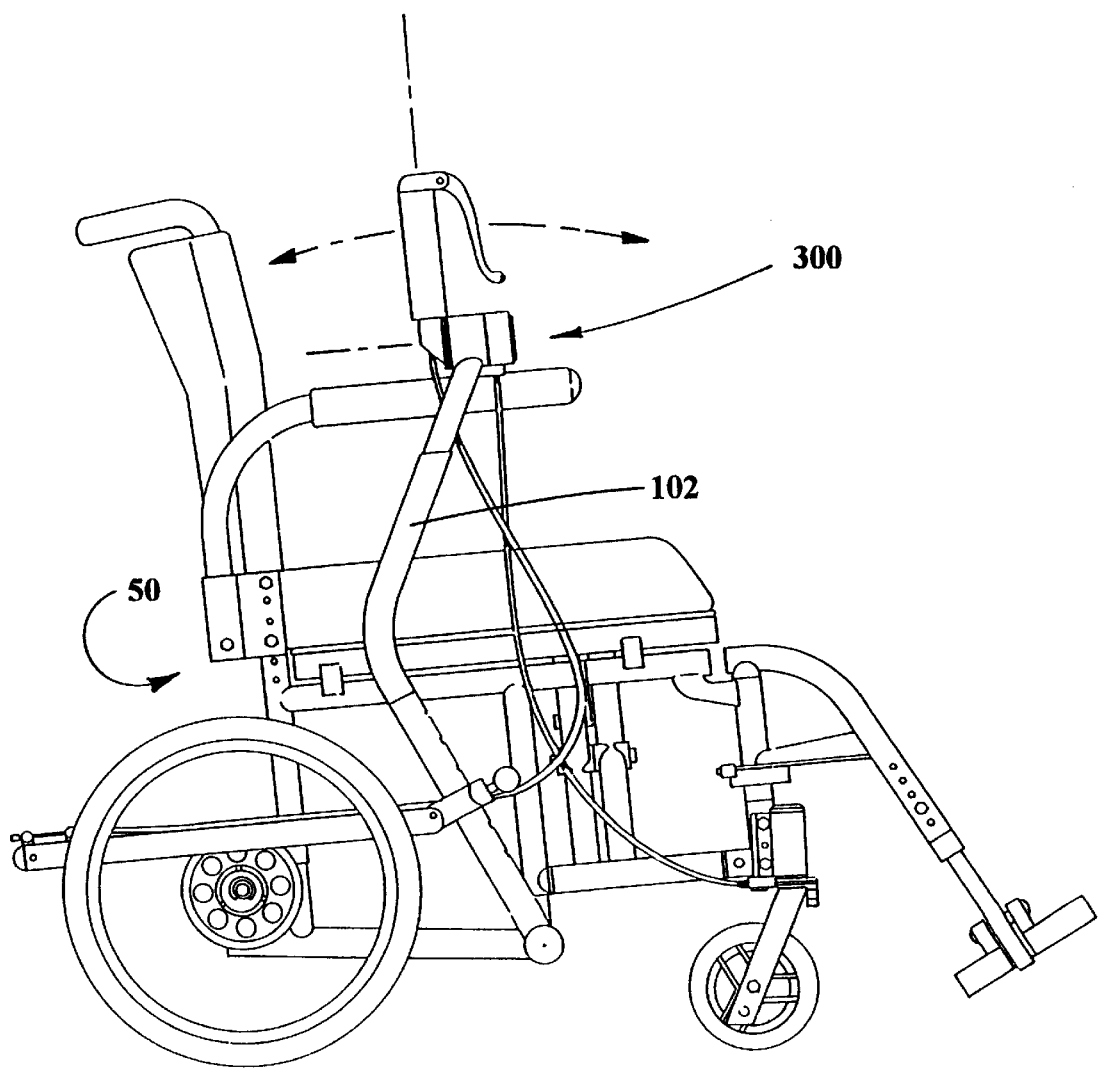
FIG. 1 is a view in side elevation of a wheel chair incorporating aspects of the present invention.

Turning more particularly to FIG. 1, one sees an occupant-propelled vehicle in the form of a wheel chair indicated generally at 50. Advantageously, the wheel chair 50 is provided with a vehicle steering arrangement 300 according to the present invention. For a more detailed understanding of the invention, one may look to FIGS. 2 and 3, which together show the substance of one embodiment of the steering arrangement 300.

The present invention provides a tilt-grip steering post 302 that permits an occupant to steer the wheel chair 50 by a simple and comfortable tilting of the steering post 302. The steering post 302 is pivotally attached to the force receiver 102 by a hinge means 304. By a combined reference to FIGS. 1 and 2, the astute observer will realize that the tilt-grip steering post 302 has an axis of rotation that is generally perpendicular to a longitudinal axis of the tilt-grip steering post 302. Furthermore, the axis of rotation of the tilt-grip steering post 302 is generally tangent to an arc of rotation of the moveable force receiver 102. As such, by means that will be set forth more particularly below, the tilt-grip steering post 102 provides the user with an ergonomically comfortable means of steering the wheel chair 50, and the invention thereby meets a plurality of needs left by the prior art.

Figure 2:
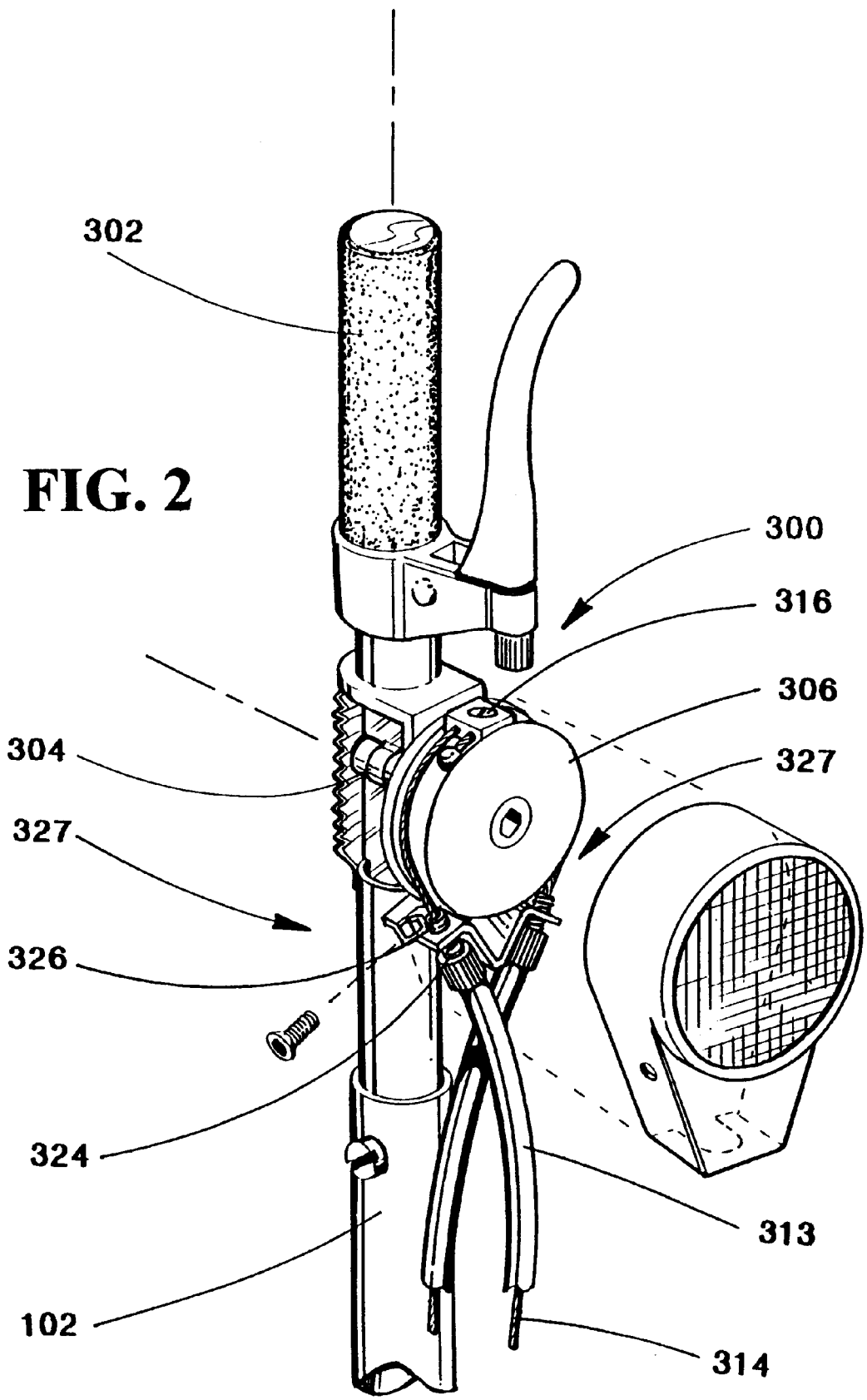
FIG. 2 is a perspective view of a top portion of a steering arrangement according to the present invention.
Figure 3:
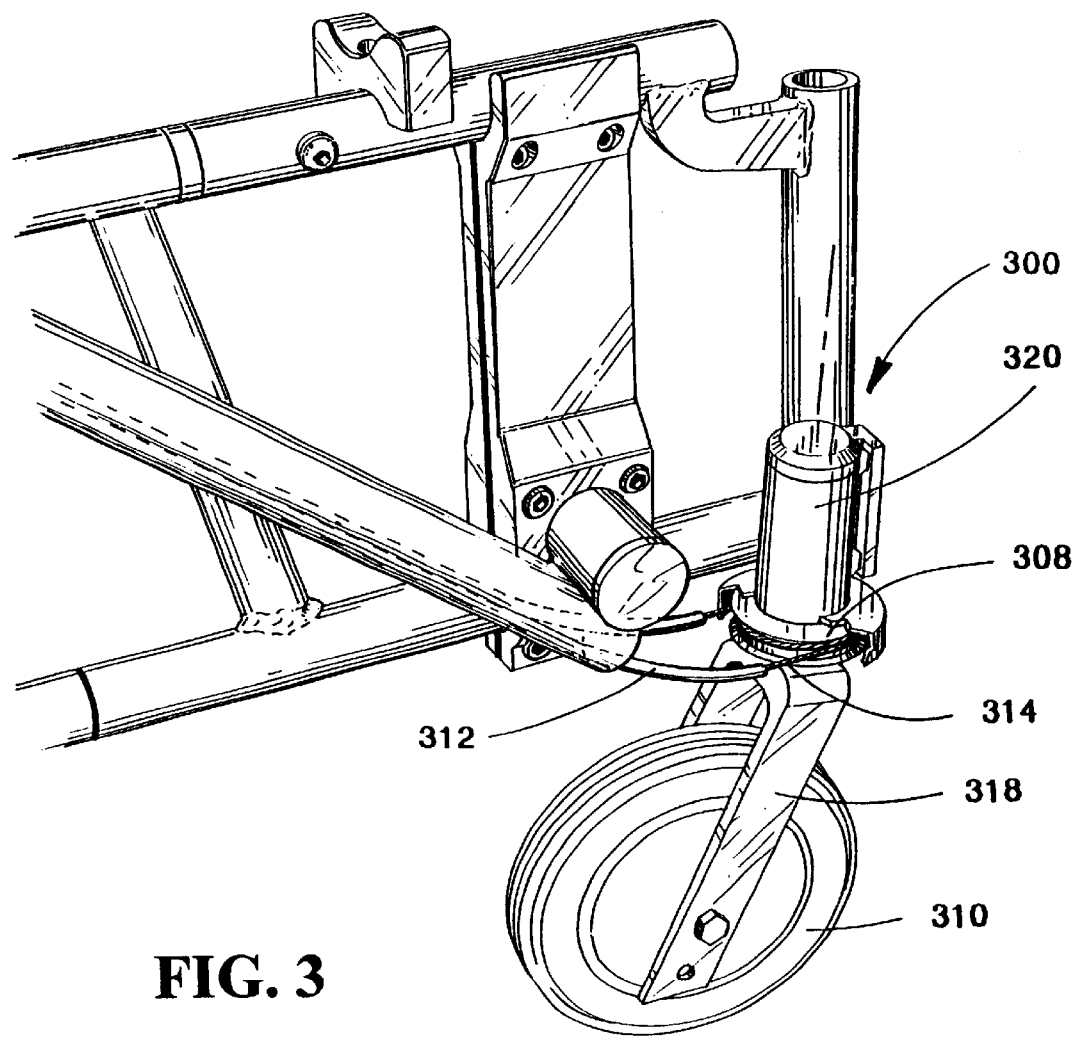
FIG. 3 is a perspective view of a bottom portion of the steering arrangement of FIG. 18A.

FIGS. 2 and 3 also show that a steering drum 306 is coaxially coupled to the steering post 302 while a steered drum 308 is coupled to a steered wheel 310. In this embodiment, the steered wheel 310 comprises a caster wheel with a yoke 318. The steered wheel 310 is steerable about a steering axis comprising in this embodiment a yoke stem 320. An inner member 314 of a flexible cable 312 is contained within an outer sheath 313 and overlies the steering drum 306 and the steered drum 308. The inner member 314 is engaged with the drums 306 and 308 in any suitable manner such as by a frictional wrapping as is shown relative to the steered drum 308 or by a set screw 316 as is shown relative to the steering drum 306. Furthermore, the embodiment of FIG. 2 further includes a means 327 for adjusting the effective length of the outer sheath 313 wherein an end 324 of an outer sheath 313 is threadedly connected by a threaded connection 326 to the force receiving lever 102 for adjustment relative thereto.

Under this arrangement, a pivoting of the tilt-grip steering post 302 rotates the steering drum 306 that yields a reciprocation of the inner member 314 of the flexible cable 312 that causes a rotation of the steered drum 308 thereby inducing a steering rotation of the steered wheel 310. This steering arrangement 300 may be considered a pull/pull arrangement since the flexible cable 312 can pull the steered drum 308 in both directions. Although it is not shown, one will note that the diameter of the steering drum 306 could be selectively varied relative to the diameter of the steered drum 308 to cause a given angular rotation of the steering drum 306 to produce a different angular rotation of the steered drum 308. By doing so, mechanical advantage between the steered drum 308 and the steering drum 306 can be manipulated as desired.

Figure 4:
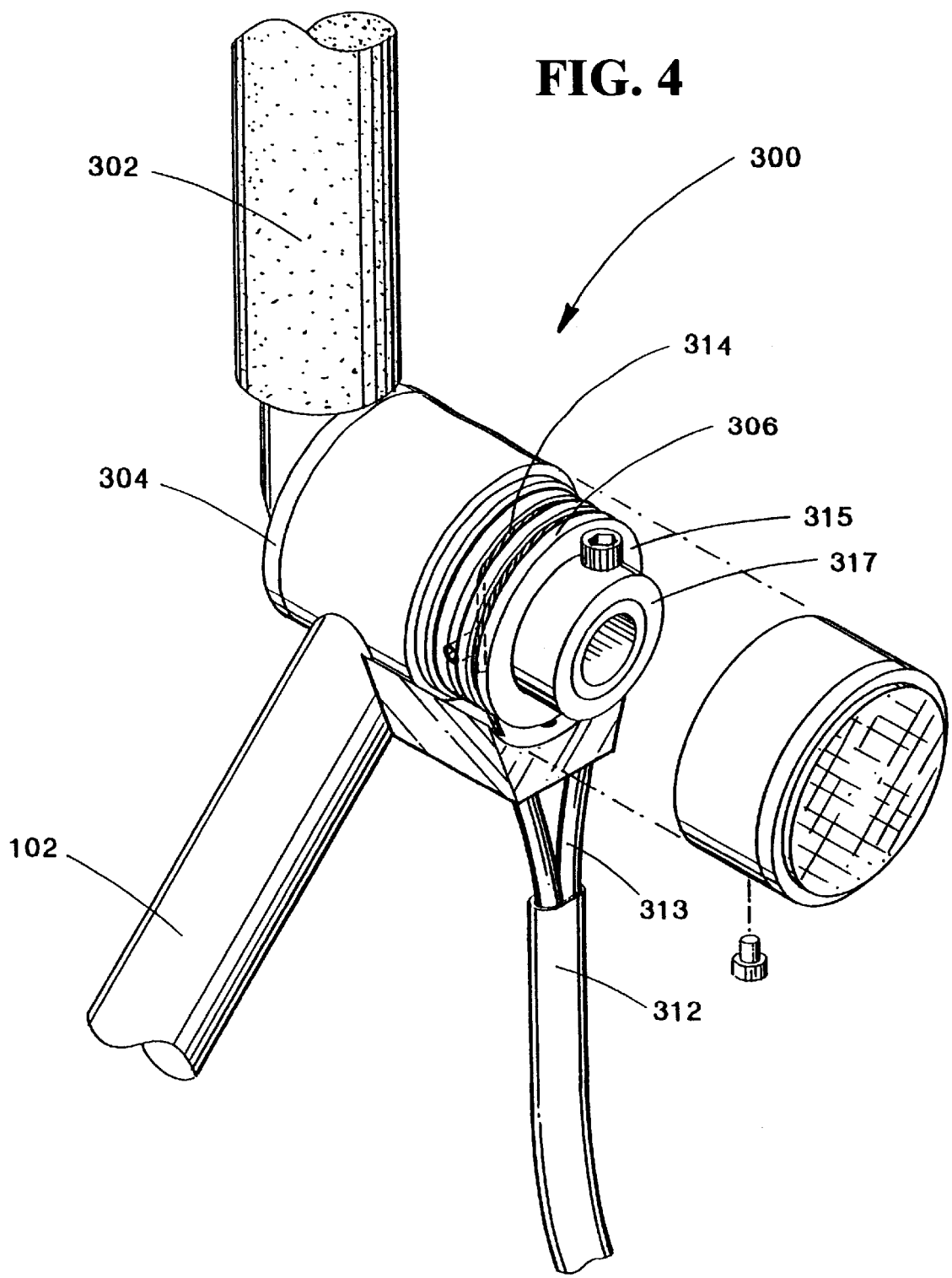
FIG. 4 is a perspective view of a top portion of an alternative steering arrangement according to the present invention.
Figure 5:
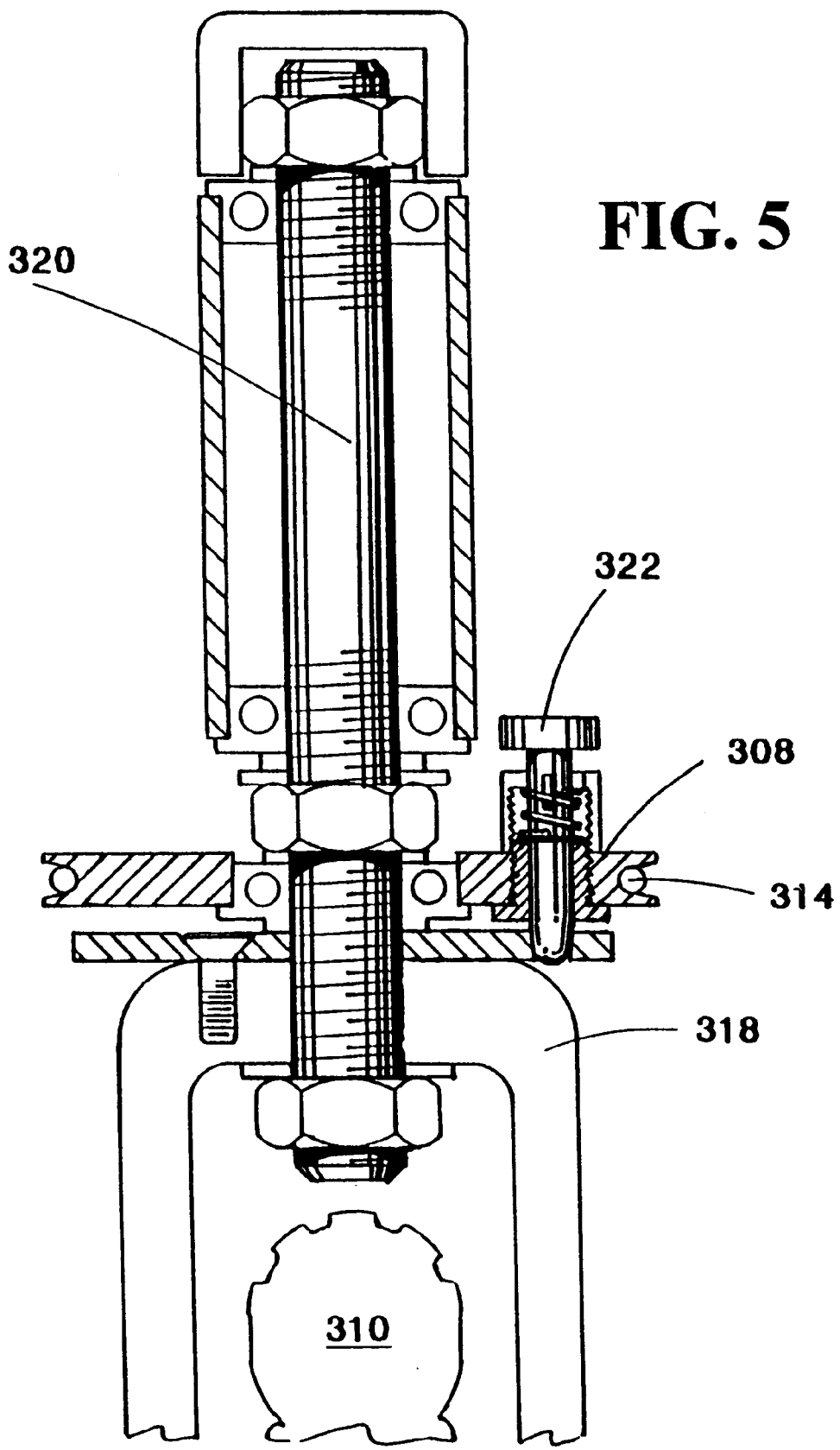
FIG. 5 is a partially sectioned view in side elevation of a preferred steered wheel.
Figure 6:
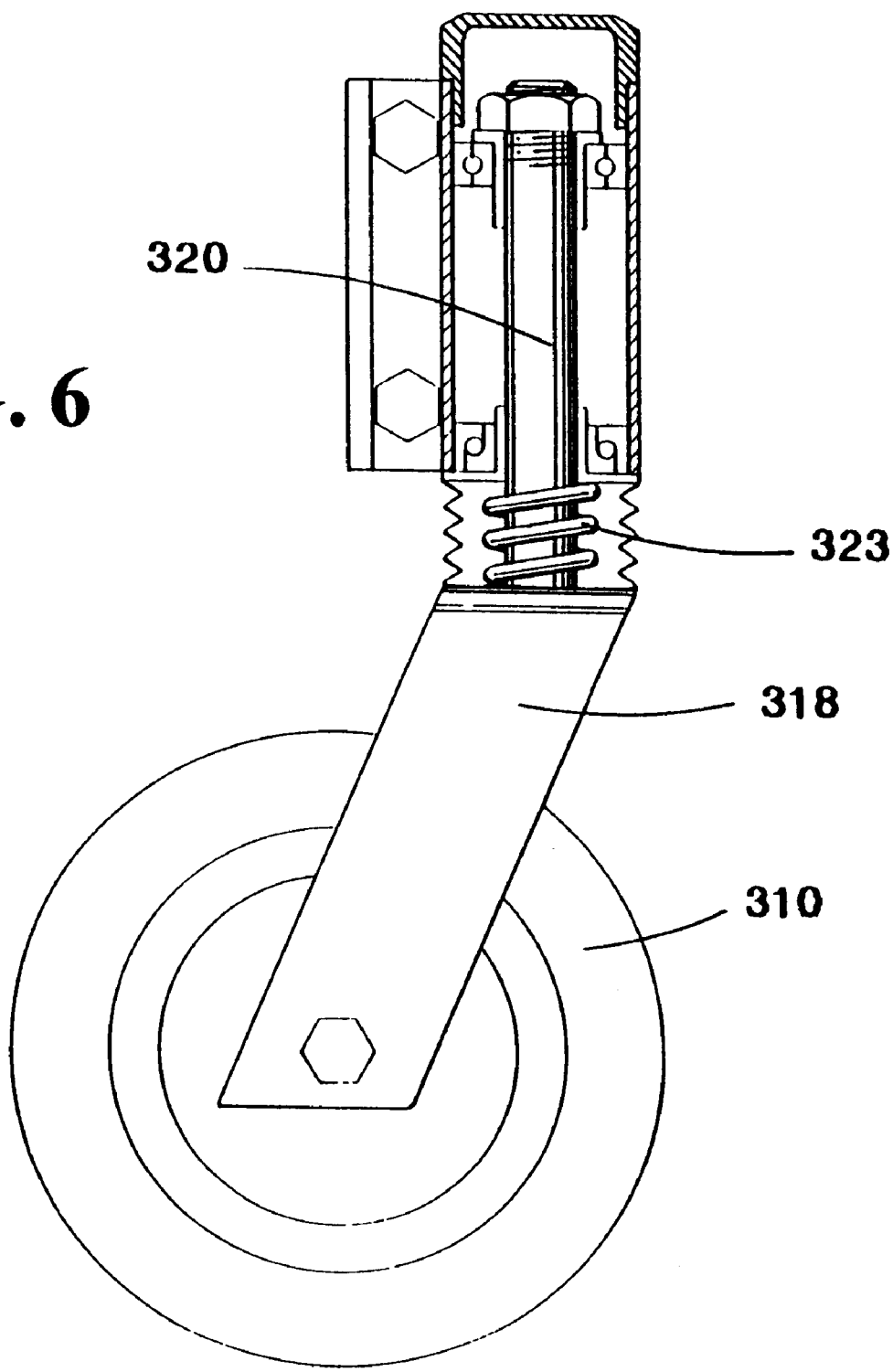
FIG. 6 is a partially sectioned view in side elevation of a wheel biased into contact with a surface on which the vehicle travels.

FIG. 4 shows an alternative embodiment of the steering arrangement 300 wherein the hinge means 304 comprises concentric cylinders 315 and 317 and wherein the flexible cable 312 comprises a flexible jacket (also indicated at 312) containing the outer sheath 313. FIG. 5 depicts a portion of another embodiment of the steering arrangement 300 wherein the steered drum 308 is disengagably indexed to the steered wheel 310 by means of a slidably engaged pin 322. Furthermore, in FIG. 6 an alternative caster wheel 310 is shown to be vertically biased by a spring 323 toward a surface on which a wheel chair 50 travels to ensure contact of the steered wheel 310 even on uneven terrain.

Figure 7:
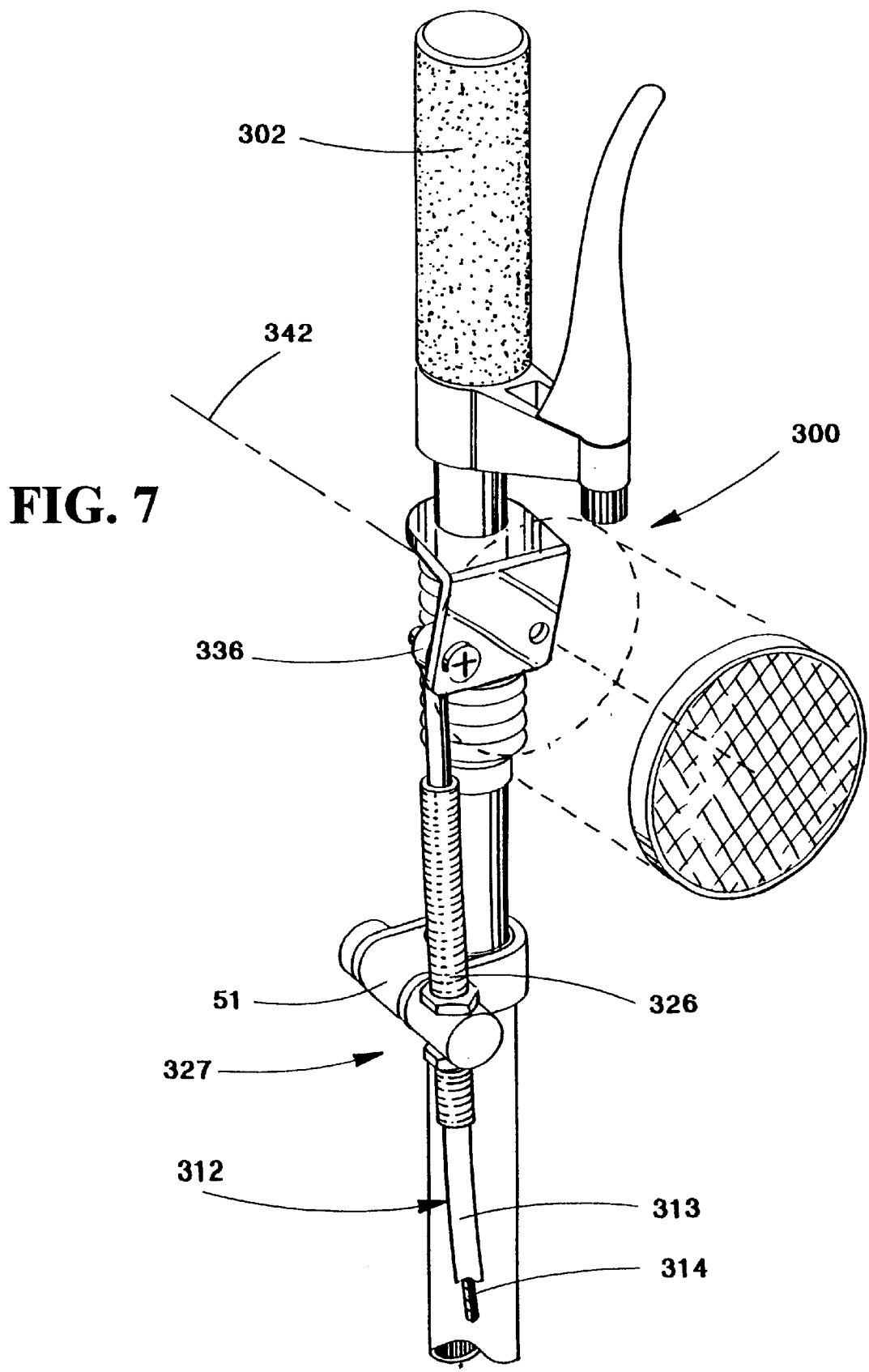
FIG. 7 is a perspective view of a top portion of an alternative steering arrangement according to the present invention.
Figure 8:
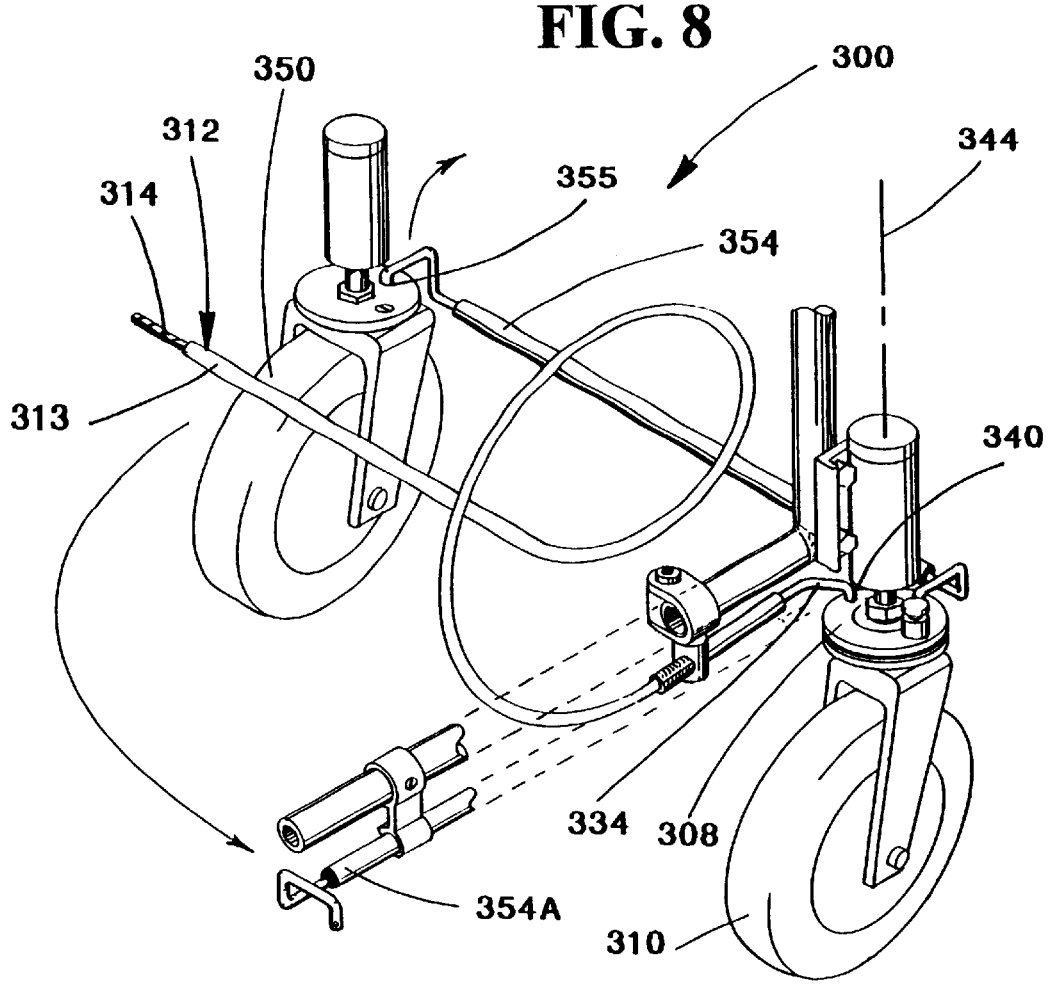
FIG. 8 is a perspective view of a bottom portion of the steering arrangement of FIG. 7.

Looking to FIGS. 7 and 8, one sees top and bottom portions of an alternative vehicle steering arrangement, which is also indicated at 300. The steering arrangement 300 again comprises a steered wheel 310, a tilt-grip steering post 302, and a flexible, sheathed cable 312. However, in this alternative embodiment, the sheathed cable 312 has an inner member 314 that is capable of transmitting loads in both tension and in compression within the outer sheath 313. As such, this steering arrangement 300 may be considered a push/pull arrangement since the sheathed cable 312 pushes the steered drum 308 to steer in one direction and pulls the steered drum 308 to steer in a second direction.

Figure 9:
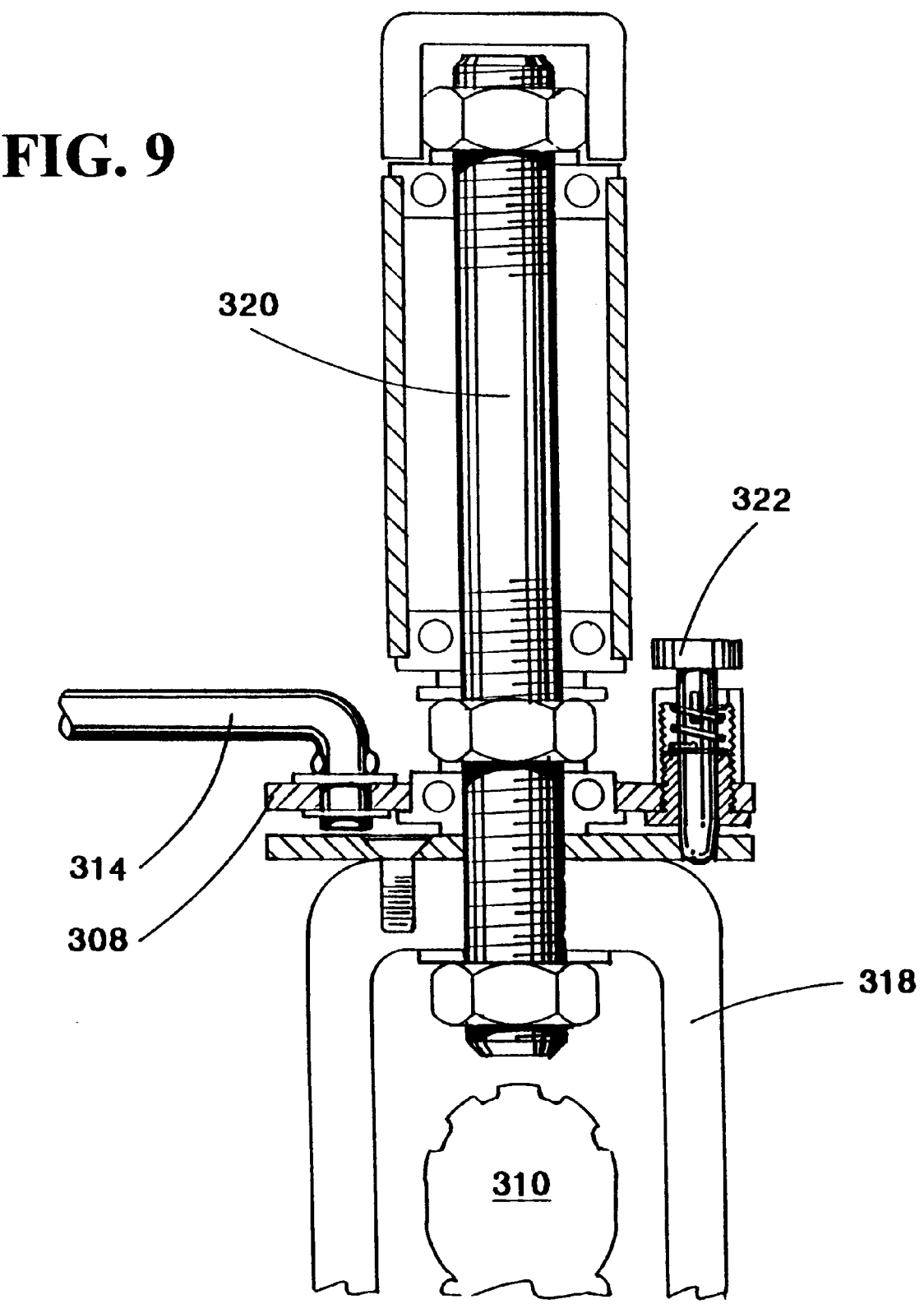
FIG. 9 is a partially sectioned view in side elevation of another steered wheel.

A first end 334 of the cable 312 is coupled at a pivot point 340 to the steered wheel 310 such that a pivoting of the steering post 302 yields a reciprocation of the inner member 314 and a consequent steering of the steered wheel 310. In a manner similar to varying the diameters of the steered and steering drums 308 and 306 of the first steering arrangement 300, a manipulation of the distance of the pivot point 336 from an axis of rotation 342 of the steering post 302 and/or a manipulation of a distance of the pivot point 340 from an axis of rotation 344 of the steered wheel 310 can enable a selected ratio of rotation of the steering post 302 relative to the steered wheel 310. Again, as is shown in FIG. 9, the inner member 314 may be disengagably indexed to the steered drum 308 by means of a slidably engaged pin 322.

In this embodiment, as FIG. 7 shows, there is included an adjusting means 327 comprising a threaded connection 326 of the outer sheath 313 with a vehicle frame 51 at the force receiving lever 102. The adjusting means 327 can be employed to adjust the neutral position of the tilt-grip steering post 302. For more effective steering in either steering arrangement 300, it may be desirable to couple the steered wheel 310 to a second wheel 350 for steering the second wheel 350 in response to a steering of the steered wheel 310.

Figure 10:
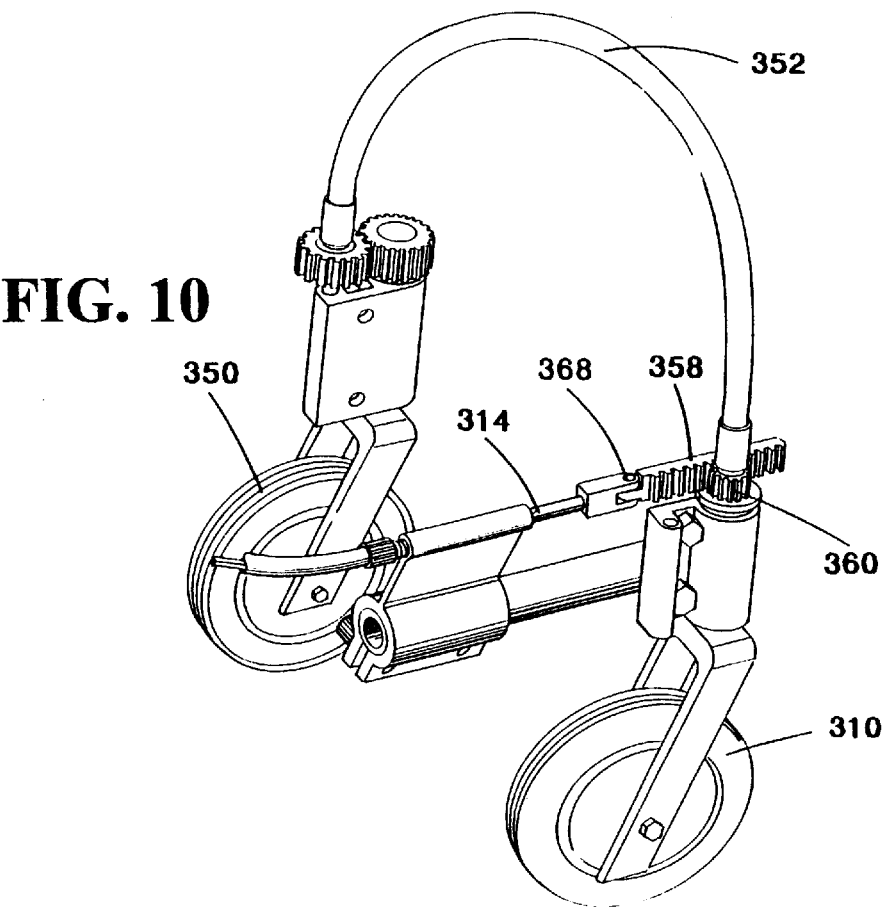
FIG. 10 is a perspective view of a means for steering a second wheel by a rotation of the steered wheel.
Figure 11:
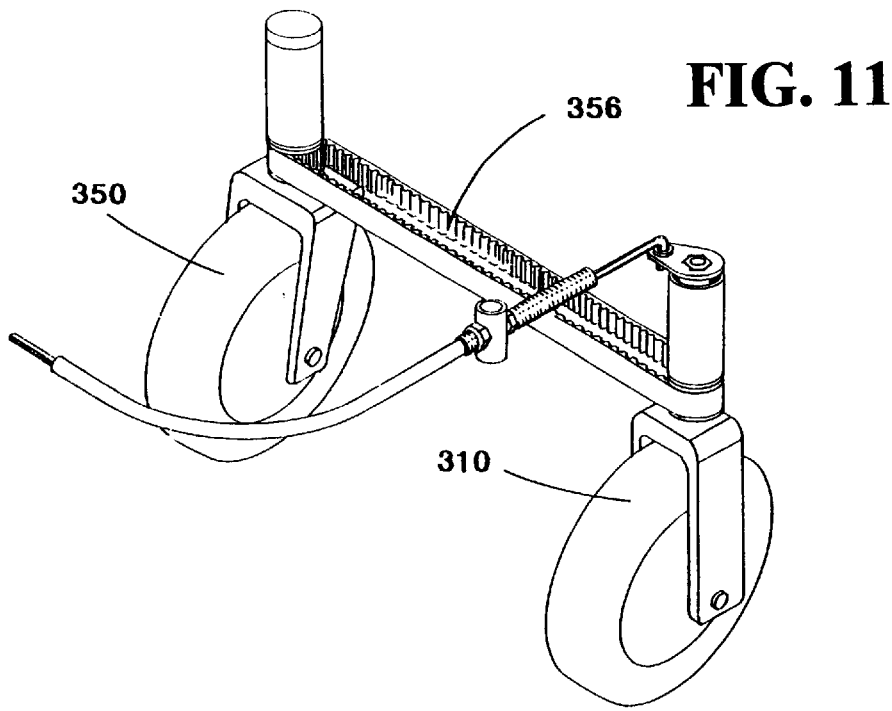
FIG. 11 is a perspective view of an alternative means for steering a second wheel by a rotation of the steered wheel.

This may be done by a number of means such as by a tie rod 354 as in FIG. 8. Tie rod 354 is removably retained in retaining hole 355 such that a user can disestablish the interconnection of the steered wheel 310 and the second wheel 350 and rotate the tie rod 354 to the orientation of tie rod 354A to permit the wheel chair 50 to be collapsed. Other means for coupling the steered wheel 310 to the second wheel 350 include a flexible shaft 352 as is shown in FIG. 10 or a toothed belt 356 as in FIG. 11. One may note that FIG. 10 shows still another means of converting the reciprocating motion of the inner member 314 to a steering motion of the steered wheel 310 in the form of a rack 358 and pinion 360 assembly. In the embodiment of FIG. 10, free movement of the steered wheel 310 may be selectively enabled by means of a disengaging hinge 368.

From the foregoing, one will realize that the present invention provides the occupant of an occupant-propelled vehicle 50 with a plurality of advantages over the prior art.

For example, the foregoing embodiments of the present invention for a vehicle steering arrangement 300 are simple in both manufacture and use. In doing so, the vehicle steering arrangement 300 accommodates the ergonomic needs of users of occupant propelled vehicles 50 by allowing comfortable and effective steering, particularly by providing the tilt-grip steering post 302. Furthermore, manipulation of the diameters of the steered and steering drums 308 and 306 and manipulation of the locations of the pivot points 336 and 340 allow ready variation of mechanical advantage and manipulation of the ratio between tilting rotation of the tilt-grip steering post 302 and the steered wheel 310. Still further, the vehicle steering arrangement 300 can be readily disengaged from the steered wheel 310 quickly and easily to allow free rotation of the steered wheel 310 about its steering axis.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. An occupant-propelled vehicle comprising:
   a vehicle frame;
   a vehicle propulsion system operably associated with the vehicle frame with a movable force receiver for receiving an input force from an occupant;
   a vehicle steering arrangement comprising:
      a tilt-grip steering post pivotally attached to the movable force receiver;
      a steering drum coupled to the tilt-grip steering post to rotate in response to a pivoting of the steering post;
      a steered wheel rotatably attached to the vehicle body and steerable about a steering axis;
      a steered drum coupled to the steered wheel to steer the steered wheel about the steering axis in response to a turning of the steered drum; and
      a flexible, sheathed cable with an inner member reciprocatable within an outer sheath wherein at least the inner member of the cable overlies and is drivingly engaged with the steered drum and the steering drum whereby a pivoting of the tilt-grip steering post causes a rotation of the steering drum thereby yielding a reciprocation of the inner member within the outer sheath and thereby yielding a rotation of the steered drum with a consequent steering of the steered wheel about the steering axis;
   wherein the steered drum is disengagably indexed to the steered wheel by a means for indexing the steered drum with the steered wheel whereby the steered drum may be disengaged from the steered wheel to permit free rotation of the steered wheel about the steering axis.

2. The occupant-propelled vehicle of claim 1 wherein the tilt-grip steering post is pivotally attached to the movable force receiver adjacent to the distal end of the movable force receiver whereby the tilt-grip steering post has an axis of rotation adjacent to the distal end of the movable force receiver and wherein the axis of rotation of the tilt-grip steering post is transverse to the longitudinal axis of the movable force receiver and wherein the steering drum has an axis of rotation that is generally parallel to the axis of rotation of the tilt-grip steering post.

3. The occupant-propelled vehicle of claim 2 wherein the axis of rotation of the tilt-grip steering post is generally perpendicular to a longitudinal axis of the tilt-grip steering post.

4. The occupant-propelled vehicle of claim 3 wherein the tilt-grip steering post has an axis of rotation generally tangent to an arc of rotation of the moveable force receiver.

5. The occupant-propelled vehicle of claim 2 wherein the vehicle frame comprises a wheel chair frame with more than two wheels and wherein at least one of the more than two wheels is the steered wheel and wherein the steered wheel comprises a caster with a yoke rotatable about a yoke stem.

6. The occupant-propelled vehicle of claim 5 wherein the wheel chair frame has at least four wheels and at least one wheel is vertically-movably attached to the vehicle frame and is biased toward a surface on which the vehicle travels whereby the steered wheel tends to maintain engagement with a surface on which the vehicle travels despite uneven terrain.

7. The occupant-propelled vehicle of claim 2 wherein the steering drum has a diameter different than a diameter of the steered drum whereby a given angular rotation of the steering drum produces a different angular rotation of the steered drum whereby mechanical advantage between the steered drum and the steering drum can be manipulated.

8. The occupant-propelled vehicle of claim 1 wherein the indexing means comprises a pin slidably engagable with the steered drum and the steered wheel.

9. The occupant-propelled vehicle of claim 2 further comprising a means for adjusting tension in the inner member.

10. The occupant-propelled vehicle of claim 9 wherein the adjusting means comprises a threaded connection of an end of the outer sheath with the vehicle frame.

11. The occupant-propelled vehicle of claim 9 wherein the adjusting means comprises a threaded connection of a first section of a body portion of the sheath with a second section of the body portion of the sheath.

12. An occupant-propelled vehicle comprising:
a vehicle frame;
a vehicle propulsion system operably associated with the vehicle frame with a movable force receiver for receiving an input force from an occupant;
a vehicle steering arrangement comprising:
a tilt-grip steering post pivotally attached to the movable force receiver;
a steering drum coupled to the tilt-grip steering post to rotate in response to a pivoting of the steering post;
a steered wheel rotatably attached to the vehicle body and steerable about a steering axis;
a steered drum coupled to the steered wheel to steer the steered wheel about the steering axis in response to a turning of the steered drum; and
a flexible, sheathed cable with an inner member reciprocatable within an outer sheath wherein at least the inner member of the cable overlies and is drivingly engaged with the steered drum and the steering drum whereby a pivoting of the tilt-grip steering post causes a rotation of the steering drum thereby yielding a reciprocation of the inner member within the outer sheath and thereby yielding a rotation of the steered drum with a consequent steering of the steered wheel about the steering axis;
wherein the vehicle frame comprises a wheel chair frame with more than two wheels and wherein at least one of the more than two wheels is the steered wheel and wherein the steered wheel comprises a caster with a yoke rotatable about a yoke stem and wherein the steered wheel is coupled to a second wheel of the more than two wheels for steering the second wheel in response to a steering of the steered wheel and wherein the second wheel comprises a caster wheel with a yoke rotatable about a yoke stem.

13. The occupant-propelled vehicle of claim 12 wherein the steered wheel is coupled to the second wheel by a tie rod.

14. The occupant-propelled vehicle of claim 13 further comprising a means for disengaging the coupling between the steered wheel and the second wheel and permitting the tie rod to be rotated to a position that permits a collapsing of the wheel chair.

15. The occupant-propelled vehicle of claim 12 wherein the steered wheel is coupled to the second wheel by a toothed belt.

* * * * *